United States Patent [19]

Rudko et al.

[11] 4,287,483

[45] Sep. 1, 1981

[54] TRANSVERSE EXCITATION LASER

[75] Inventors: Robert I. Rudko, Holliston; James W. Barnie, Stoughton, both of Mass.

[73] Assignee: Raytheon Company, Lexington, Mass.

[21] Appl. No.: 71,809

[22] Filed: Sep. 4, 1979

[51] Int. Cl.³ .............................................. H01S 3/09
[52] U.S. Cl. ........................ 331/94.5 PE; 331/94.5 G
[58] Field of Search .................. 331/94.5 PE, 94.5 G, 331/94.5 C, 94.5 D; 313/270

[56] References Cited

U.S. PATENT DOCUMENTS

| 3,696,307 | 10/1972 | Beaulieu et al. | 331/94.5 G |
| 3,848,202 | 11/1974 | Hyne | 331/94.5 PE |
| 3,852,685 | 12/1974 | Erlich et al. | 331/94.5 G |

FOREIGN PATENT DOCUMENTS 1256398 12/1971 United Kingdom .

OTHER PUBLICATIONS

"Long-Lived $CO_2$ Lasers with Distributed Heterogeneous Catalysis", by Browne et al., *J. Phys. D: Appl. Phys.* vol. 7(1974), pp. 2464-2470.
"A Compact High-Repetition-Rate TEA $CO_2$ Laser", by Pace et al., *Jour. of Phys. E: Scientific Inst.*, vol. 10, 1977, p. 208.

*Primary Examiner*—William L. Sikes
*Assistant Examiner*—Léon Scott, Jr.
*Attorney, Agent, or Firm*—Milton D. Bartlett; Joseph D. Pannone

[57] ABSTRACT

A method for producing high peak energy radiation from a gaseous lasing medium excited by a main electric discharge which is transverse to the laser beam path. The main electric discharge current flows between elongated copper main electrodes positioned on opposite sides of the laser path and follows a pre-ionizing discharge between a plurality of copper elements positioned adjacent the optical path. The pre-ionizing discharge is selected in time and intensity to produce a gradation of temperatures along a thin layer of copper oxide formed on the copper elements and catalytically aiding in rapid recombination of carbon monoxide with the free oxygen which is produced by the discharge between the main electrodes.

10 Claims, 3 Drawing Figures

TRANSVERSE EXCITATION LASER

BACKGROUND OF THE INVENTION

High power transverse electric amplifier lasers having gaseous media have generally required a continuous flow of new gas through the laser to replace constituents of the gas which have decomposed and result in reduction in the life of the laser.

Attempts to add catalysts to a laser to avoid replenishing the gas have resulted in optical degradation of the lasing system since the large surface area of the catalyst have required it to be fragile and/or powdery. Such powdery material has been found to become detached from its support during discharge of the laser and will deposit on optical surfaces such as windows or mirrors thereby degrading their optical properties.

High power transverse electric amplifier lasers require the catalysts since the laser gases partially dissociate in the high temperatures of the main laser discharge to form gaseous elements which severely curtail the peak laser energy due to arcing. The attempts to stabilize the laser gas by placing large surface area catalysts such as capsules of powder in the laser envelope has resulted in the powder floating in the gaseous medium until portions of it deposit on the optical system such as the mirrors or output windows thereby degrading laser performance and resulting in curtailed life. It has, therefore, been generally necessary to operate such lasers with a continuous flow of new gas through the laser from gas lines connected to the laser.

SUMMARY OF THE INVENTION

In accordance with this invention there is disclosed the discovery of a method wherein a flash plate may have ionizing discharge elements made of conductive metal material which will oxidize to provide a coating which will act as a catalyst for aiding in the recombination of gaseous components produced during the laser discharge to form the original gaseous compounds. More specifically, there is disclosed that a flash plate for a laser may be made of copper which is oxidized so that when assembled in a laser having a reducing atmosphere such as a mixture of helium, carbon dioxide, nitrogen and carbon monoxide, any oxygen produced by the laser discharge will recombine with the excess carbon monoxide upon striking the copper oxide surface of the flash plate. Copper oxide catalysts are effective at temperatures in the range of 80° to 180° C., and this temperature range is readily achieved in regions of the flash plate elements due to an ionizing discharge produced between elements thereof. In accordance with the method of this invention, the intensity and duration of the ionizing discharge is selected to produce the effective catalytic temperature ranges of said copper oxide surface portions during the period following the main laser discharge.

BRIEF DESCRIPTION OF THE DRAWINGS

Other and further objects and advantages of the invention will become apparent as the description thereof progresses reference being had to the accompanying drawings wherein.

DESCRIPTION OF THE PREFERRED METHOD

Figure 1:
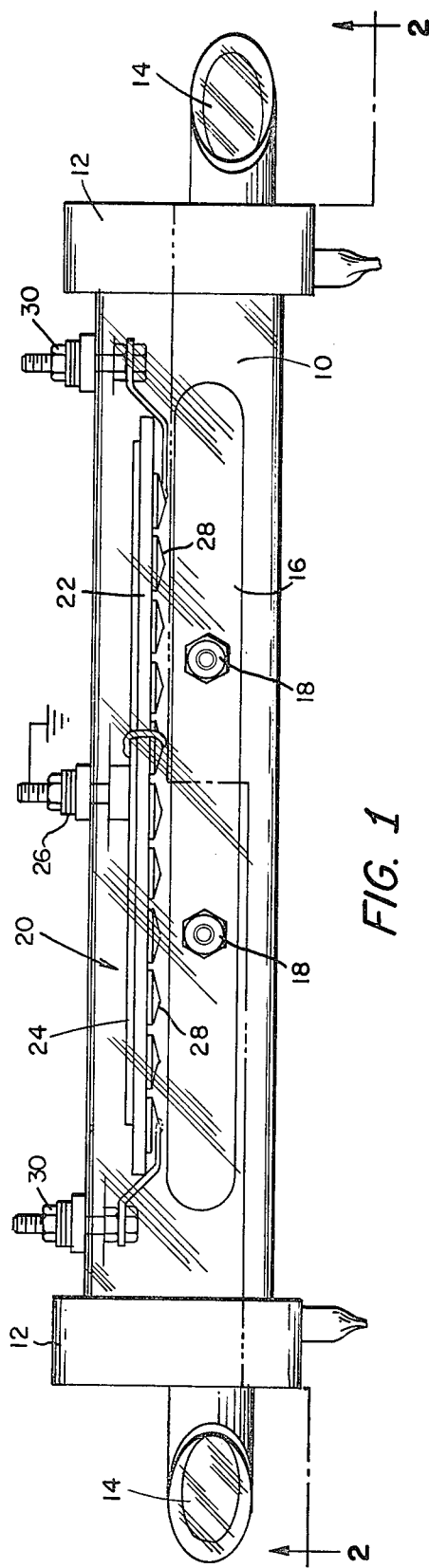
FIG. 1 is a vertical sectional view of a transverse electric field laser amplifier embodying the invention.
Figure 2:
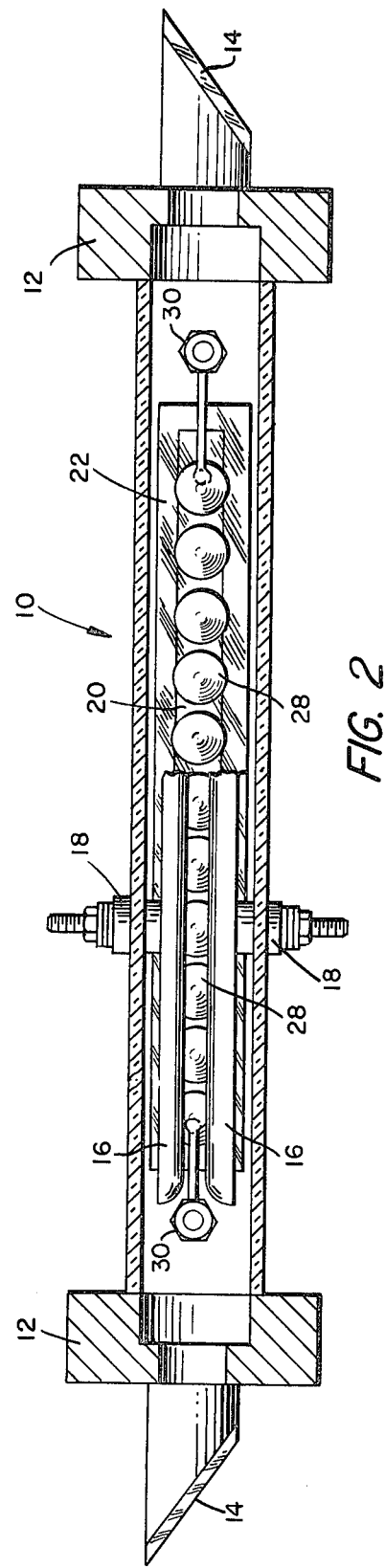
FIG. 2 is a cross-sectional view of the laser shown in FIG. 1.

Referring now to FIGS. 1 and 2 there is shown a transverse electric field laser comprising an elongated tubular envelope 10 fabricated of a dielectric material such as quartz having metal tubular end members 12 attached to brewster angle windows 14. The envelope 10 contains a pair of elongated transverse electrodes 16 supported by conductive leads 18 attached to electrodes 16 and extending through the walls of the body 10.

Extending adjacent to electrodes 16 and spaced therefrom is a flash plate structure 20 comprising a dielectric support plate 22, and a metal backing plate 24, which is connected to a support lead 26 extending through the wall of envelope 10. The opposite side of dielectric support 22 has a plurality of metal buttons 28 which form with the backing plate 24, a plurality of spaced capacitors. The buttons at the ends of the flash plate 20 are individually connected to lead-in conductors 30 extending through envelope 10, and the button 28 in the center of the flash plate is connected to the backing plate 24 and hence to the lead-in terminal 26. The envelope 10 contains a lasing mixture of gas comprising, for example, helium, nitrogen, carbon dioxide and carbon monoxide. The overall pressure of the gaseous mixture is preferably on the order of one atmosphere or greater. In accordance with this invention a sealed-off tubulation 32 is provided through which the lasing medium, which is a gas in a gaseous mixture was introduced into the envelope 10. An example of a lasing gas mixture which may be used is 40% He, 30% $CO_2$, 26% N, and 4% CO measured by pressure and filled to a pressure of one atmosphere at room temperature.

During each laser discharge, some of the $CO_2$ breaks down into $O_2$ and CO. To aid in recombinations of the $O_2$ with the CO, buttons 28 are coated with a layer of material such as copper oxide which act as a catalyst to enhance recombination of $O_2$ with the CO to form $CO_2$. However, since such catalytic enhancement is highest over a relatively narrow temperature range, such as 80° to 180° C., it has been the practice to use coatings or powder of other materials having different temperature ranges to enhance the reconversion of $O_2$ and CO to $CO_2$.

In accordance with this invention there is disclosed the discovery that gas laser operation is degraded by coating of particles of catalytic material on the brewster angle window and that such deposits may be prevented by making the catalytic material of a compound comprising oxygen and the same metal as at least some of the electrodes.

In operation, the oxygen produced by breakdown of the $CO_2$, during a discharge of the laser, reacts with the electrodes in the tube to produce an oxide compound of the metal of such electrodes. Applicants have found that copper forms a useful electrode for the flash plate electrode buttons 28 which, during operation, are elevated in temperature. Buttons 28 will have temperature gradients along their surfaces due to the ionizing discharge between the buttons. The temperature range includes temperatures in the range between 80° C. and 180° C. where copper oxide assists in recombination of oxygen and CO to form $CO_2$. Furthermore, since the ionizing discharge heats portions of the buttons 28 to temperatures above 180° C. during the ionizing discharge, during the subsequent cooling process, the buttons 28 have substantial regions thereof passing through the optimum range of catalytic conversion temperatures.

In accordance with this invention it is preferable that the main discharge electrodes 16 be made of material such as copper which is the same as the flash plate electrode material. Preferably, the main electrodes have a contour which is curved for optimum main discharge uniformity of high field strength gradients between the electrodes 16. Reduction in the free oxygen prior to each discharge of the main electrodes allows more discharge current to be applied to the laser medium during the main discharge before an arcing condition occurs. For example, a voltage pulse of 15,000 volts and a current of 300 amperes applied to electrodes 16, which are on the order of 15 centimeters long, can produce a peak power output of 500 kilowatts of laser energy. Such a laser structure can be made to operate stably without arcing provided the sequence of power is applied to the electrodes with the proper duration of timing between the ionizing and main lasing discharge pulses in accordance with the method of this invention.

Figure 3:
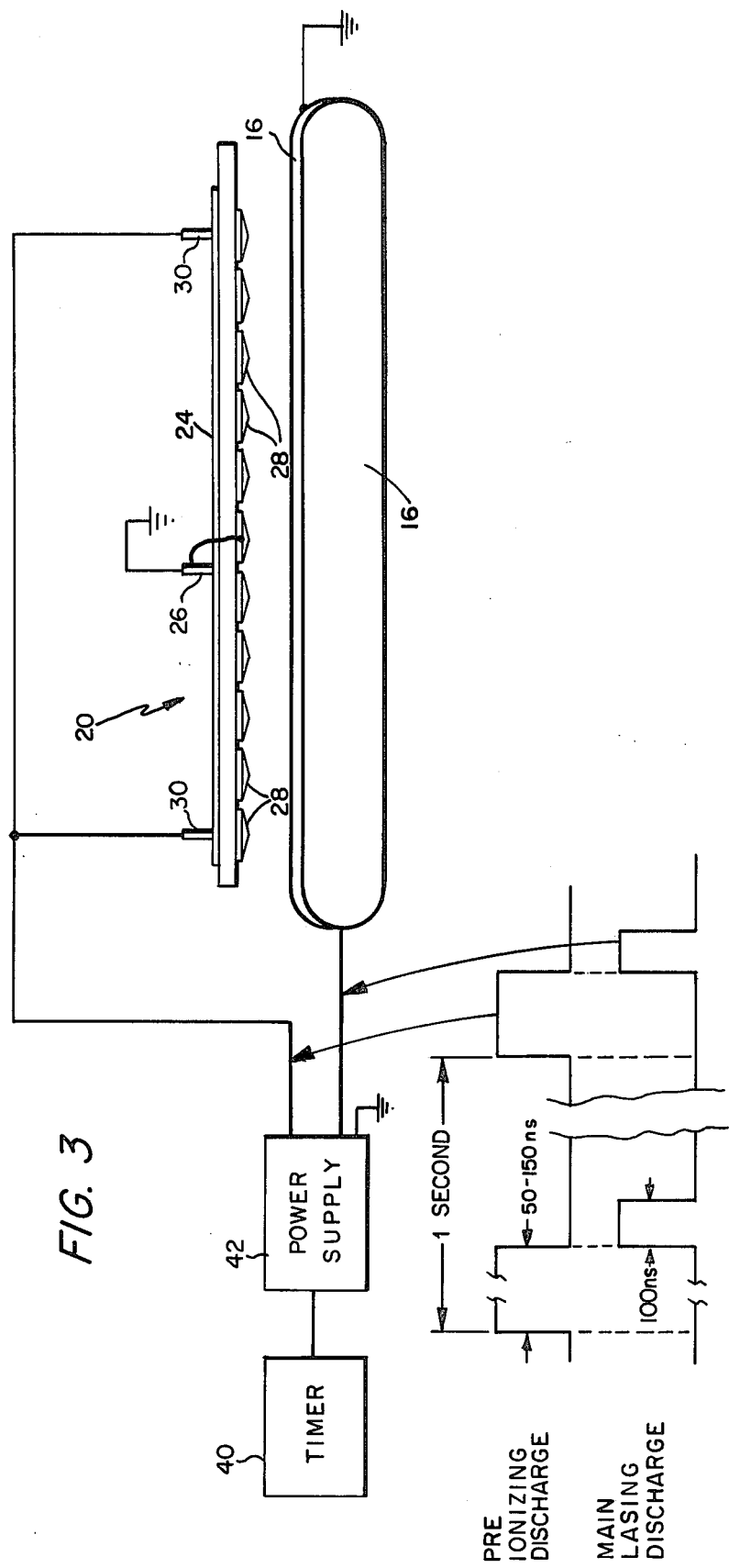
FIG. 3A is a functional flow diagram of a laser system utilizing the laser of FIGS. 1 and 2.
FIG. 3B is a timing diagram for operation of the system of FIG. 3A.

FIGS. 3 and 3A show respectively a functional flow diagram and a timing diagram for a laser power supply system illustrating one embodiment of this invention. A timer 40 supplies a timing pulse at a repetition rate of one per second to a power supply 42 to initiate the supply of a pulse of voltage to lead-ins 30 to preionize the laser medium. Preferably, the duration of the preionizing pulse is a few nanoseconds to 150 nanoseconds and is of a few thousand volts. This produces a temperature rise at the points of discharge between the buttons 28 of several hundred degrees C. A main lasing discharge pulse of power having a duration of, for example, 100 nanoseconds, is applied to the electrodes 16 approximately at the cessation of the preionizing discharge between the buttons 28. While the duration of the preionizing pulse applied between the buttons 28 may be varied between 50 and 15 to vary the temperature thereof without causing an unstable or arcing condition, the duration of the main lasering pulse applied between the electrodes 16 preferably has a duration not greater than one hundred nanoseconds. Otherwise severe degradation of lasering action and arcing is likely to ensue. Thus, the temperature of the electrodes and particularly the buttons 28 can be adjusted by choice of the length of the ionizing discharge to adjust the temperature profile of the backing plate to produce optimum conditions for recombination of the $O_2$ and CO to $CO_2$. Such ionizing pulse length and/or intensity is not critical to the operating efficiency of the laser so that advantage may be taken of selecting the optimum temperature range of the flash plate elements to produce catalytic conversion and to prevent coating build-up on the laser windows.

This completes the description of the embodiments of the invention illustrated herein. However, many modifications thereof will be apparent to persons of ordinary skill of the art without departing from the spirit and scope of this invention. For example, the envelope 10 could be made of metal with insulating bushings at the lead-ins, other output window types could be used, and other pulsing systems could be used. Accordingly it is desired that this invention be not limited to the particular details described herein accept as defined by the appended claims.

What is claimed is:

1. The method of operating a gaseous laser having a gaseous medium comprising carbon dioxide and helium excited by a discharge transverse to the optical path comprising the steps of:
   providing an ionizing discharge in an elongated region adjacent to said optical path and between elongated electrodes positioned on either side of said optical path;
   said ionizing discharge being produced between a plurality of copper elements to produce a range of temperatures extending from ambient to several hundred degrees and having a thin layer of copper oxide covering said elements;
   producing a high current discharge between said electrodes to produce a lasing beam; and
   allowing a period of time to elapse to permit portions of the carbon dioxide gas which have broken down into constituent gases of carbon dioxide to reform into carbon dioxide by catalytic action of the copper oxide surface of said copper elements at elevated temperatures.

2. The method in accordance with claim 1 wherein the pressure in said laser and the spacing between said elongated electrodes forms a product which is greater than the minimum breakdown voltage in said gaseous mixture.

3. The method in accordance with claim 1 wherein the gaseous medium comprises nitrogen and carbon monoxide at a medium pressure in said laser substantially at or above atmospheric pressure.

4. The method in accordance with claim 1 wherein said step of producing said discharge comprises terminating said discharge prior to the formation of an arc between said elongated electrodes.

5. The method in accordance with claim 1 wherein said time is on the order of 100 nanoseconds.

6. The method of operating a laser comprising the steps of:
   coating a plurality of metal electrodes which extend in spaced relation throughout a region of a lasing medium comprising said gas, with an oxide of said metal;
   impressing a voltage between said electrodes to initiate a discharge therebetween to ionize a constituent of said gas;
   producing a lasing discharge through said gas; and
   allowing recombination of dissociated constituents of said gaseous medium by contact with elevated temperature regions of said coatings on said electrodes.

7. The method in accordance with claim 6 wherein: said step of producing said lasing discharge comprising maintaining said gaseous medium at or above atmospheric pressure.

8. The method in accordance with claim 6 wherein said gaseous medium comprises helium, nitrogen, carbon monoxide and carbon dioxide.

9. The method in accordance with claim 6 wherein said step of producing said lasing discharge comprises terminating said discharge prior to the formation of an arc between said elongated electrodes.

10. The method in accordance with claim 6 wherein the duration of said lasing discharge is on the order of 100 nanoseconds.

* * * * *